April 28, 1925.
B. E. STODDARD
VEHICLE SPRING
Filed Oct. 30, 1922
1,535,744
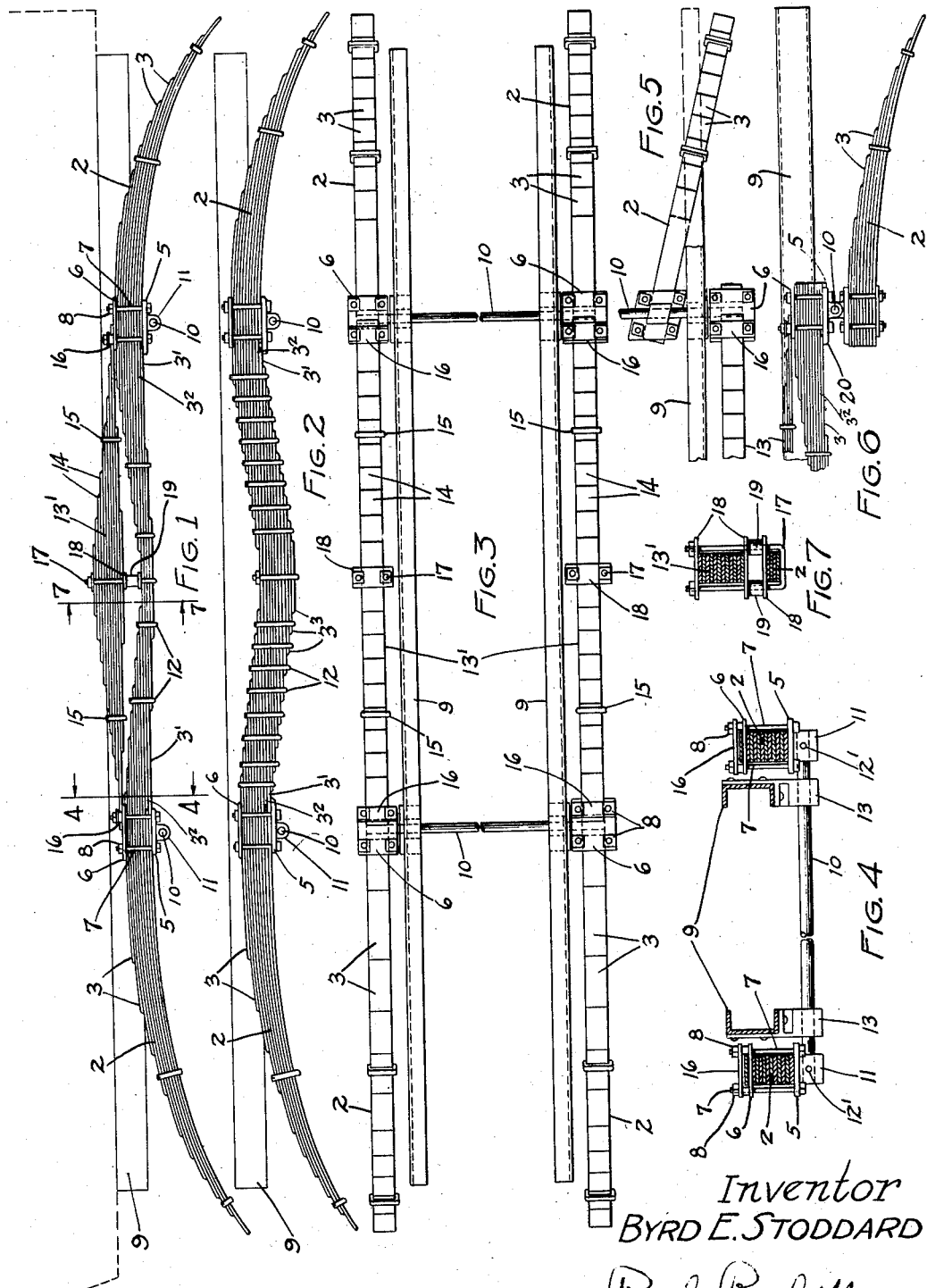
Inventor
BYRD E. STODDARD
By Paul, Paul & Moore
ATTORNEYS Patented Apr. 28, 1925.

1,535,744

UNITED STATES PATENT OFFICE.

BYRD E. STODDARD, OF MINNEAPOLIS, MINNESOTA.

VEHICLE SPRING.

Application filed October 30, 1922. Serial No. 597,975.

*To all whom it may concern:*

Be it known that I, BYRD E. STODDARD, a citizen of the United States, and resident of Minneapolis, in the county of Hennepin and State of Minnesota, have invented certain Improvements in Vehicle Springs, of which the following is a specification.

This invention relates particularly to improvements in springs for vehicles, and particularly to springs designed for use on automobiles, and the objects of the invention are to provide a vehicle with springs that will cause the vehicle body to be carried smoothly and without the jolts or jars incident to the usual vehicle spring construction, any sudden vertical thrust being absorbed by the springs.

The invention consists generally in the constructions and combinations hereinafter described and particularly pointed out in the claims;

In the accompanying drawings forming part of this specification;

Figure 1 is a side elevation of a pair of springs constructed in accordance with my invention;

Figure 2 is a similar view, showing a modified construction;

Figure 3 is a plan view of a set of the springs showing means for connecting the same, and for connecting the springs to the vehicle body;

Figure 4 is a vertical section on line 4—4 of Figure 1, looking in the direction of the arrows;

Figure 5 is a detail plan, and

Figure 6 is a detail side elevation showing a modified construction;

Figure 7 is a detail section on the line 7—7 of Figure 1, looking in the direction of the arrows.

In the drawings, 2, 2, represent the springs proper, each of which consists of a series of overlapping leaves 3, 3. Each spring 2 has its leaves 3 firmly clamped together by a clamp, consisting of lower and upper plates 5 and 6, locking bolts 7 and nuts 8.

Each spring 2 may extend beyond its clamp, as shown in Figures 1, 2 and 3, or may end at the clamp as shown in Figures 5 and 6.

In each instance a pair of the springs 2, 2, are arranged in the same vertical plane, and each such pair of springs may extend either lengthwise or crosswise of the vehicle body. Where the springs extend lengthwise of the chassis or vehicle body there will be one pair of springs at each side of the chassis or vehicle body, the free ends of the springs being suitably supported on the axles, or the ends of the rear springs may be supported on the rear axle and the front ends on a suitable cross bar. Where the springs extend crosswise of the chassis or vehicle body their ends will be supported on the axles or on suitable cross-bars.

In Figures 3 and 4 I have shown side bars 9, 9, by which the vehicle body is carried, the outline of the lower part of the body being indicated by dotted lines in Figure 1.

Each spring 2 is rigidly connected, preferably through the lower plate 5 of its clamp, to a shaft 10. As here shown each plate 5 is provided with a lug 11, and the end of the shaft 10 is secured in said lug by a pin 12', by welding, or by other suitable means.

Bearings 13, for the shafts 10, are provided on the bars 9, as shown, and the shafts 10 turn freely in these bearings.

Each pair of springs 2, 2, have their inner ends connected by a suitable connecting member, preferably as shown in Figures 1, 2 or 3. I do not limit myself to the use of the connecting means here shown.

In Figures 1 and 2 I have shown the lower leaf $3^1$, of one spring 2, extending to the clamp of the other spring, and overlapped by the second leaf $3^2$ of the other spring, while each of the other leaves of the springs are arranged in the ordinary step relation to the leaves 3' and $3^2$ and are held in alinement by clips 12.

In Figure 1, I have also shown an auxiliary spring 13' consisting of a series of leaves 14 held together by clips 15. The ends of the longest leaf of this spring preferably rest upon the upper plates 6 of the spring clamps, and are held in place by a second plate 16 arranged upon two of the clamp bolts 7.

The lower leaf of the auxiliary spring is arranged above the connection between the springs 2, 2, as shown in Figure 1. A U-shaped clip 17 extends around the central part of the auxiliary spring 13' and around the connection between the springs 2, 2. Said clip carries the cross-plates 18 separated by the sleeves 19 arranged on the legs of the U-shaped clip 17. (Figure 7.)

In Figure 2 the auxiliary spring is omitted while additional leaves 3³ are arranged below the central part of the connection between the springs 2, 2.

In Figures 5 and 6 one of the springs 2 is shown extending only through its clamp. As here shown the clamp for the spring is reversed and the connection to the shaft 10 is on the top of the spring. I have also here shown this connection arranged inside of the bars 9 (Figure 5). I may employ with this construction a connecting member between the clamps substantially the same as that shown in Figures 1 and 2, except that the connecting member is in this instance provided with an independent clamp 20 (Figures 5 and 6) that is arranged above the shaft 10 and is rigidly secured thereto.

It will be noted that in all forms of my construction the vehicle body is supported wholly by the bearings on the rotatable shafts, and that there is no connection between the spring suspension and the frame except through the rotatable shafts. In this manner I avoid any direct shock being delivered to the vehicle frame, but all shocks are delivered through the rotatable bearing.

The details of the construction and arrangement may be varied in many particulars without departing from my invention.

Operation: When any wheel of the vehicle goes over an obstruction or drops into a hole, which would naturally cause an upward or downward thrust at the corresponding bearing of the body, thereby imparting a jolt to the vehicle body, the weight of the body, resting on the other bearings which are all interconnected and the resistance to turning of the corresponding shaft 10 causes two sides of the body to tend to remain at substantially the same level snubbing the shock or jar that would otherwise be produced and causing the same to be absorbed by the springs.

In other words, since the shaft 10 cannot rotate in its bearings 11, an upward movement of the outer end of any one of the springs is counteracted by the spring connected to the same shaft and through the weight of the body resting on the interconnected bearings, the shock or jar is absorbed by the joint action of all of the springs. The result is that the reaction of the springs and the pitch and the roll of the body of the vehicle are practically eliminated.

I claim as my invention:

1. The combination with a pair of vehicle springs located substantially in line with each other and in substantially the same vertical plane, of a shaft below each spring and extending at right angles to the plane of the springs, bearings in which said shafts are mounted, a vehicle body frame supported upon said bearings and located in the same horizontal plane as the upper portions of the springs, said springs having no connection with said frame except through said shafts.

2. The combination, with a pair of vehicle springs arranged substantially in line with each other and in substantially the same vertical plane, of a shaft rigidly secured to each spring, and extending at right angles to the plane of the springs, bearings in which said shafts are mounted and in which they are free to turn, and a connecting member between said springs, a vehicle body frame supported upon said bearings, and said springs having no connection with said frame except through said shafts.

3. The combination, with a pair of vehicle springs arranged substantially in line with each other and in substantially the same vertical plane, of a shaft rigidly secured to each spring and below the same, and extending at right angles to the plane of the springs, bearings in which said shafts are mounted, and in which they are free to turn, and a yielding connecting member between said springs, said bearings being arranged to support a vehicle body frame, and said springs having no connection with said frame except through said shafts.

4. The combination, with two pairs of oppositely arranged vehicle springs, the springs of each pair being arranged substantially in line with each other and in substantially the same vertical plane, and with overlapping meeting ends, of shafts each having its ends rigidly secured to the oppositely arranged springs, bearings below the springs in which said shafts are mounted and in which they are free to turn, and connecting members between the springs of each pair, said bearings being arranged to support a vehicle body frame, and said springs having no connection with said frame except through said shafts.

5. The combination, with two pairs of oppositely arranged vehicle springs, the springs of each pair being arranged substantially in line with each other and in substantially the same vertical plane, of shafts each having its ends rigidly secured in the oppositely arranged springs, bearings in which said shafts are mounted and in which they are free to turn, and yielding connecting members between the springs of each pair, said bearings being arranged to support a vehicle body frame, and said springs having no connection with said frame except through said shafts.

6. The combination, with a pair of vehicle springs, arranged substantially in line with each other and in the same vertical plane, of a rotatable shaft rigidly secured to each spring, bearings pivotally supported upon said shafts, said bearings providing supports for a vehicle body frame, and a flexible connecting member between the inner ends of said springs.

7. The combination, with a pair of vehicle springs arranged substantially in line with each other and in the same vertical plane, of a rotatable shaft rigidly secured to each spring, bearings pivotally supported upon said shafts, said bearings providing supports for a vehicle body frame, a flexible connecting member between the inner ends of said springs, and an auxiliary spring arranged above said connecting member and having its ends bearing upon said springs.

8. The combination, with a pair of vehicle springs arranged substantially in line with each other and in the same vertical plane, of a rotatable shaft rigidly secured to each spring, bearings pivotally supported upon said shafts, said bearings providing supports for a vehicle body frame, a flexible connecting member between the inner ends of said springs, an auxiliary spring arranged above said connecting member and having its ends bearing upon said springs, and clips connecting the ends of said auxiliary spring to said springs and the central portion of said auxiliary spring to said connecting member.

9. The combination, with a pair of vehicle springs arranged substantially in line with each other and in the same vertical plane, of a rotatable shaft rigidly secured to each spring, bearings pivotally supported upon said shafts, said bearings providing supports for a vehicle body frame, a connecting member between the inner ends of said springs, an auxiliary spring arranged above said connecting member and having its ends bearing upon said springs, and clips connecting the ends of said auxiliary spring to said springs and the central portion of said auxiliary spring to said connecting member.

10. The combination with a chassis and vehicle springs extending from end to end of the chassis, a pair of rods extending from one spring to another, the chassis resting on bearings on the two rods, there being pivotal connections between the rods and chassis bearings and the rods constituting the sole connection between the chassis and the springs.

In witness whereof, I have hereunto set my hand this 18th day of October 1922.

BYRD E. STODDARD.